United States Patent [19]

Wolford et al.

[11] Patent Number: 4,679,844
[45] Date of Patent: Jul. 14, 1987

[54] FASTENING ARRANGEMENT FOR A CONVERTIBLE BOOT

[75] Inventors: Gerald T. Wolford, Frazer; Dwight R. Kleinlein, Washington; Hubert F. Stewart, Rochester, all of Mich.

[73] Assignee: Chrysler Motors Corporation, Highland Park, Mich.

[21] Appl. No.: 837,937

[22] Filed: Mar. 10, 1986

[51] Int. Cl.⁴ ............................................. B60J 7/20
[52] U.S. Cl. ................................................. 296/136
[58] Field of Search ................ 296/136; 292/DIG. 5, 292/137, 163

[56] References Cited

U.S. PATENT DOCUMENTS

| | | | |
|---|---|---|---|
| 3,154,341 | 10/1964 | Booth | 296/136 |
| 3,891,252 | 6/1975 | Lehman | 296/136 |
| 4,512,606 | 4/1985 | Trostle et al. | 296/136 |
| 4,600,233 | 7/1986 | Boydston | 296/136 |

*Primary Examiner*—Robert R. Song
*Attorney, Agent, or Firm*—Gerald P. Dundas

[57] ABSTRACT

A fastening arrangement providing for easy and quick attachment of a convertible top boot to a vehicle. A slidable bolt is mounted flush in each of the interior trim panels adjacent the forward extensions of the top receiving well. The bolts engage with keepers carried by the outboard portion of the boot and secure the forward outboard portions of the boot to the vehicle body.

6 Claims, 5 Drawing Figures

FASTENING ARRANGEMENT FOR A CONVERTIBLE BOOT

FIELD OF THE INVENTION

This invention relates to a convertible top boot construction used to enclose a folding top storing well formed in the vehicle body. The boot construction employs a unique means for easily detachably securing the boot to the vehicle body.

BACKGROUND OF THE INVENTION

Convertible automobiles generally have a well adjacent the rear seat or storage area for receiving the top when it is lowered. A cover or "boot" for enclosing this well and giving a "finished" appearance to the vehicle has long been provided. However, boot usage is very often avoided due to difficulty in securing the boot to the vehicle. Thus, for many years, button type snaps placed about the periphery of the boot were used in conjunction with cooperating snaps located on the body of the vehicle. Body panel tolerance variations, however, frequently resulted in alignment problems which caused difficulties in attaching the boot to the vehicle.

The seriousness of the boot attachment problem may be appreciated by reference to the prior art. Thus, U.S. Pat. No. 2,664,309 discloses a snap fastener attachment arrangement whose principal advantage over the prior art button fastener is that it is concealed as opposed to the visible button system. However, the patent describes that a plurality of snap fasteners must be used, and this presents the same alignment problem as found with the button fastener.

In a similar vein, U.S. Pat. Nos. 3,222,203; 3,223,446 and 3,237,982 each relate to convertible boot securing arrangements for attaching the boot to the vehicle. Again, however, each of these patented arrangements involved a plurality of individual attachment devices located about the periphery of the boot. This requires substantial individual effort in manipulating each fastener and also does not eliminate alignment difficulties which frequently arise during vehicle manufacture or usage.

SUMMARY OF THE INVENTION

The present invention provides for a quick and easy to use device for securing to the vehicle the forward portions of the boot which flank the rear seat area. This fastening device involves a bolt slidably mounted on the vehicle body which is engageable with a keeper provided on the underside of the boot. In addition to providing quick, easy to use and highly reliable secure attachment, the fastener of this invention provides a pleasing appearance which is an important consideration due to the highly visible position of this boot fastening point.

The bolt portion of the fastener of this invention is slidably mounted in a housing which in turn is designed to be flushly mounted in an interior trim panel. The bolt is preferably spring biased and includes a handle shaped portion whereby the bolt may be slidably used. A keeper carried on the underside of the boot is positioned to be engageable with the bolt when the boot is placed on the vehicle.

DESCRIPTION OF THE DRAWING

The accompanying drawings illustrate one embodiment in accordance with the present invention wherein.

DESCRIPTION OF THE PREFERRED EMBODIMENT

Figure 1:
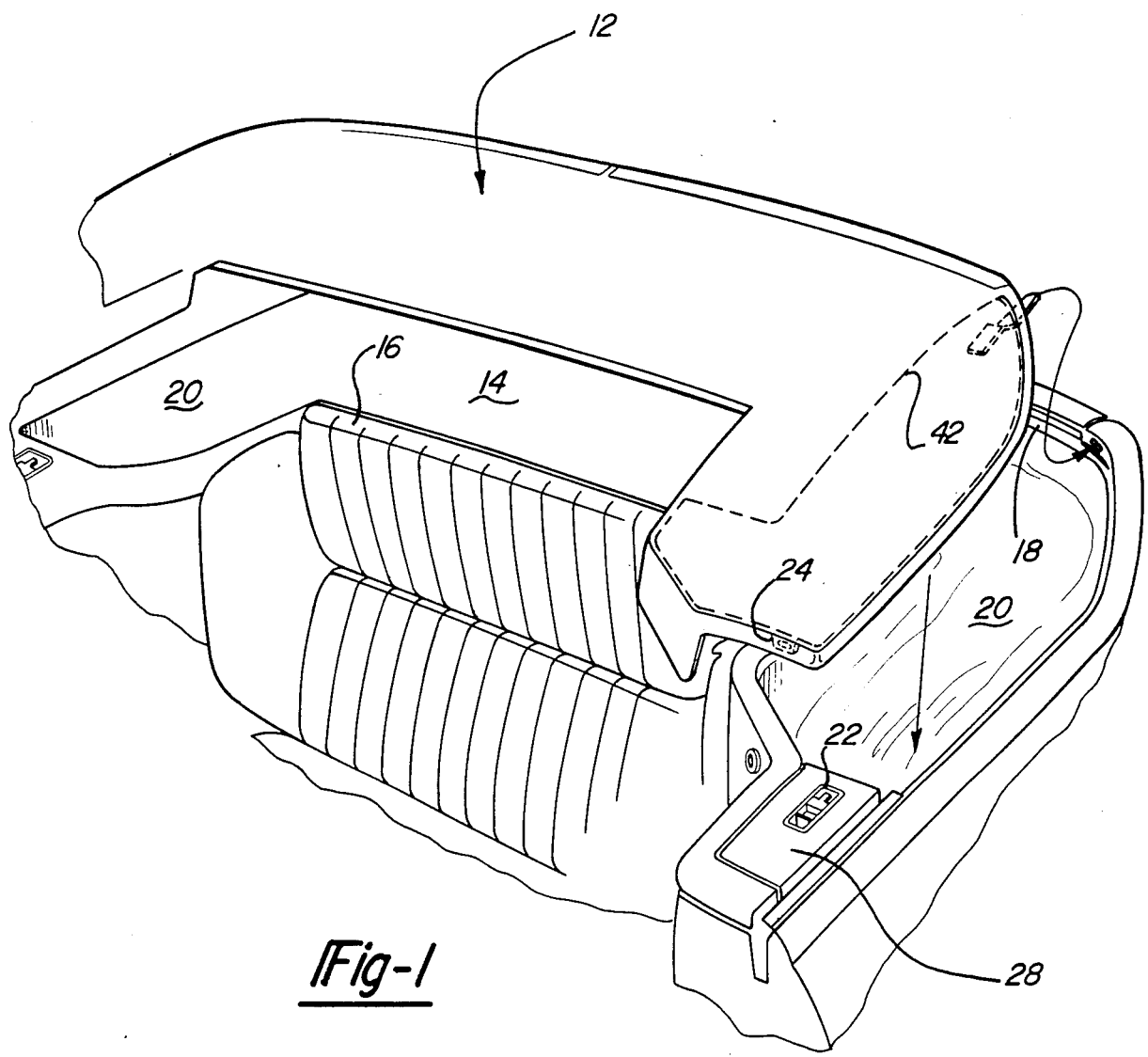
FIG. 1 is an exploded perspective view showing a boot in relation to a convertible wall portion of a vehicle.

With reference to the accompanying drawing and FIG. 1, an intermediate rear portion of a convertible type vehicle body is illustrated showing a boot 12 overlying a convertible top receiving well 14. The well extends transversely of the vehicle body, generally between a rear seat or storage compartment 16 and a body flange 18 and has forward laterally extending convertible top linkage storage area 20 on each side of the rear seat 16. The boot 12 is provided to protectively enclose the top storage well and can be of the hard cover type or a flexible cover made of any suitable fabric or plastic sheet material. Generally, the boot is dimensioned to slightly overlie the periphery of the top well opening.

Figure 2:
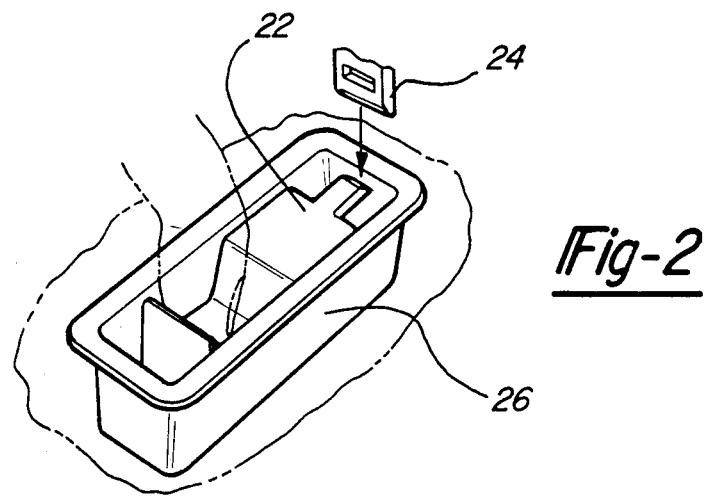
FIG. 2 is a perspective view showing the boot locking fastener of this invention.

The boot fastening arrangement of this invention as seen with reference to FIGS. 1 and 2 is composed of a bolt member indicated generally by 22 which is engageable with a keeper 24 carried by the underside of the boot 12. The boot is slidably disposed in a housing 26 which, in a preferred arrangement, is flushly mounted in an interior trim panel 28, mounted adjacent each side of the vehicle at the forward portion of the top storage well.

Figure 3:
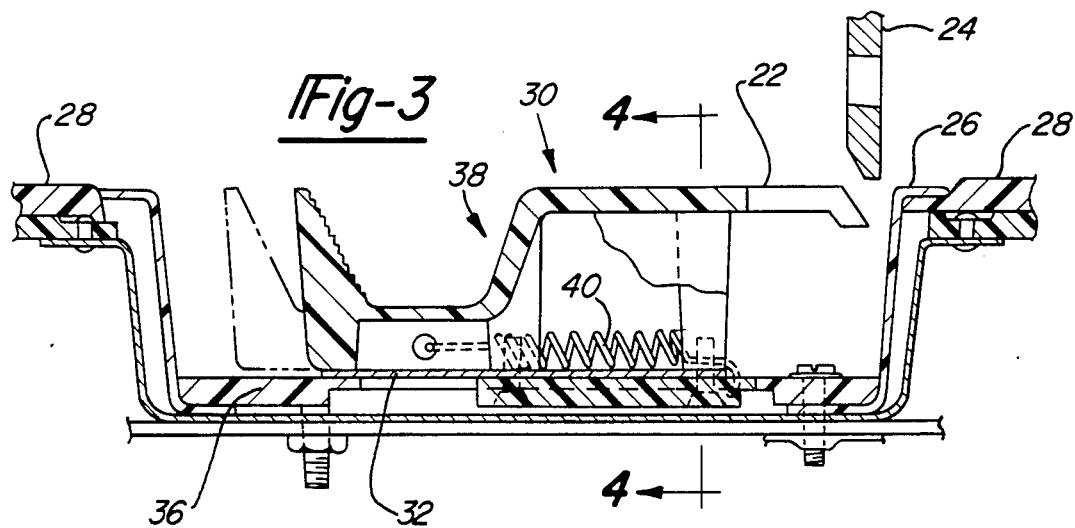
FIG. 3 is a cross-sectional view illustrating the details of the boot fastener of this invention.
Figure 4:
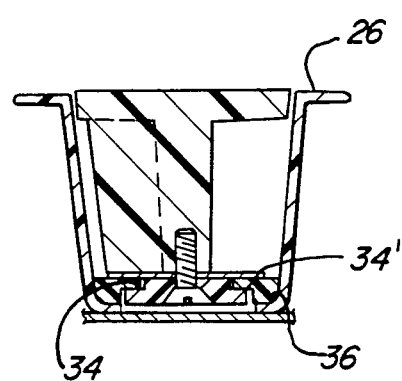
FIG. 4 is a cross-sectional view taken in the plane indicated at 4—4 in FIG. 3.
Figure 5:
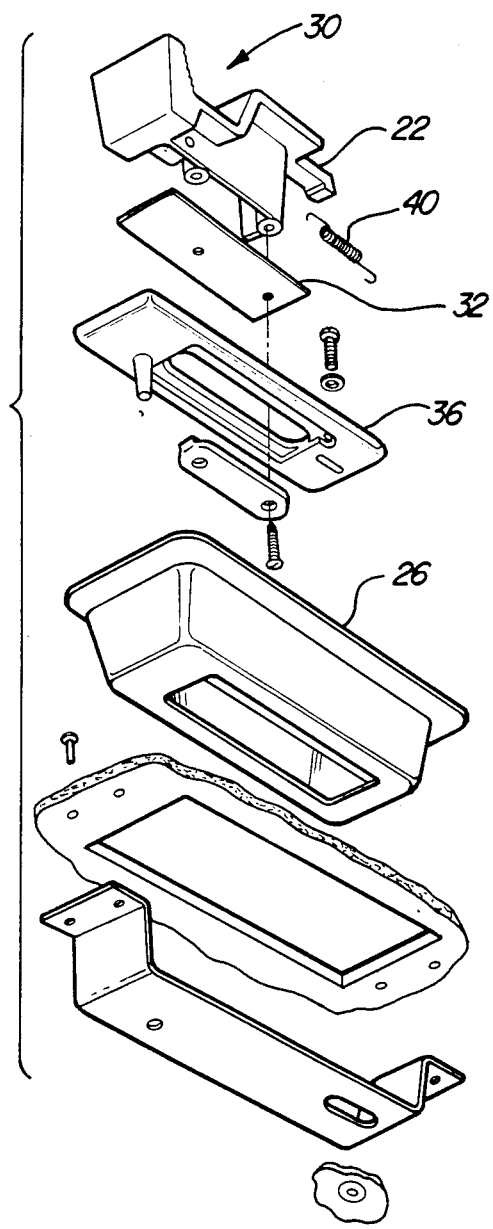
FIG. 5 is a perspective view showing details of the construction of the boot fastener of this invention.

With reference to FIG. 3, a carriage 30 having floor plate 32 is slidably mounted on ramps 34,34' provided on support plate 36 which is threadedly secured to housing 26. The carriage 30 is formed with a nose or bolt portion 22 and a recessed actuator handle 38. A spring 40 biases the carriage 30 in a direction such that the bolt 22 is in engagement with the keeper 24 when the boot is placed over the well 14. In a preferred embodiment, the two outer peripheral side sections of the boot are reinforced with ABS underlining 42 to give the boot rigidity and shape and the keeper 24, which may be a U-shaped member or disc provided with a control aperture, is anchored to the underside of the boot by the ABS material.

To attach the boot to the vehicle at the forward element, the carriage 30 is manually slid forward within the housing 26 against the bias of spring 40 to allow the keeper 24 to enter the housing where it will be engaged by the bolt 22 upon release of the carriage.

While the present invention has been disclosed in connection with the preferred embodiment thereof, it will be understood that there may be other embodiments which fall within the spirit and scope of the appended claims.

What is claimed is:

1. In a motor vehicle having a convertible top, a storage well for receiving a foldable top of the vehicle, said well having top linkage receiving areas at forward extensions of the well laterally flanking the rear seat area of the vehicle, and a boot for overlying the storage well when the top is stored therein, a fastening arrangement for securing the boot to the vehicle comprising:
- a trim panel member disposed forward of each well area adjacent the side of the vehicle and laterally flanking the rear seat;
- a housing member in each trim panel;
- a bolt slidably disposed on said housing; and
- a keeper carried at each side of said boot so as to be in overlying relationship to said housing, said keeper extending into said housing and in locking engagement relationship with said bolt when the boot is positioned over the well.

2. A fastening arrangement according to claim 1 wherein said housing is adapted to be received in an aperture in said trim panel member to provide a flush fit of said housing in said trim panel.

3. A fastening arrangement according to claim 1 wherein said bolt is manually operable by handle means adjacent the bolt and within said housing.

4. A fastening arrangement according to claim 3 further including resilient means for urging the bolt to a keeper engaging position.

5. A fastening arrangement according to claim 1 wherein said keeper is provided with an aperture positioned to receive said slidably bolt, said keeper being adhesively secured to said boot.

6. A fastening arrangement according to claim 1 wherein said boot has a stiff plastic reinforcement piece at each of its outboard portions adjacent the side of the vehicle and wherein the keeper is a disc provided with an aperture positioned to receive said bolt, said keeper being mounted to the underside of said boot by having a portion thereof encapsulated in the plastic reinforcement.

* * * * *